(12) United States Patent
McGowan et al.

(10) Patent No.: US 9,146,323 B1
(45) Date of Patent: Sep. 29, 2015

(54) POSITION DEPENDENT ELECTRONIC POWER SEQUENCING

(71) Applicants: Kabushiki Kaisha Toshiba, Tokyo (JP); Toshiba Medical Systems Corporation, Otawara-shi (JP)

(72) Inventors: Daniel McGowan, Wauconda, IL (US); Michelle Canzolino, Evanston, IL (US)

(73) Assignees: Kabushiki Kaisha Toshiba, Tokyo (JP); Toshiba Medical Systems Corporation, Otawara-shi (JP)

( * ) Notice: Subject to any disclaimer, the term of this patent is extended or adjusted under 35 U.S.C. 154(b) by 0 days.

(21) Appl. No.: 14/458,750

(22) Filed: Aug. 13, 2014

(51) Int. Cl.
*G01T 1/164* (2006.01)

(52) U.S. Cl.
CPC ...................................... *G01T 1/164* (2013.01)

(58) Field of Classification Search
CPC ........................... G01T 1/164; A63F 2300/105
See application file for complete search history.

(56) References Cited

U.S. PATENT DOCUMENTS

| | | | |
|---|---|---|---|
| 4,302,791 A | 11/1981 | Buchanan et al. | |
| 6,396,169 B1 | 5/2002 | Voegeli et al. | |
| 7,337,333 B2 | 2/2008 | O'Conner et al. | |
| 8,279,646 B1 | 10/2012 | Hamstra | |
| 2007/0096028 A1* | 5/2007 | Tanaka | 250/363.07 |
| 2011/0077511 A1* | 3/2011 | Kim et al. | 600/427 |
| 2013/0024508 A1* | 1/2013 | Sathish et al. | 709/204 |
| 2015/0038840 A1* | 2/2015 | Hassan et al. | 600/436 |

* cited by examiner

*Primary Examiner* — Kiho Kim
(74) *Attorney, Agent, or Firm* — Oblon, McClelland, Maier & Neustadt, L.L.P.

(57) ABSTRACT

An electronic detector module includes an array of detection crystals that emits light in response to electromagnetic radiation, and at least one detector that detects the light emitted by the crystal array and that generates an output based on the light detected. The electronic detector module also includes a power sequencing circuit including an accelerometer that detects a position of the electronic detector module, and a control circuit that provides power to the electronic detector module based on the position.

20 Claims, 4 Drawing Sheets

POSITION DEPENDENT ELECTRONIC POWER SEQUENCING

FIELD

Embodiments described herein generally relate to power sequencing of electronic modules depending on their respective positions.

BACKGROUND

Complex systems, such as medical imaging systems including positron emission tomography (PET) systems, may include multiple subsystems, or modules, that if powered simultaneously can cause significant inrush current in the system power supply. Without sequencing such inrush currents may cause power fluctuations that may lead to the resetting of some of the modules.

To avoid large inrush currents, power to system modules can be sequenced. For example, system modules can be sequenced according to their physical location by addressing an appropriate slot in a system backplane. However, such addressing is not always possible in systems without backplanes and with only a limited number of pins for configuration.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
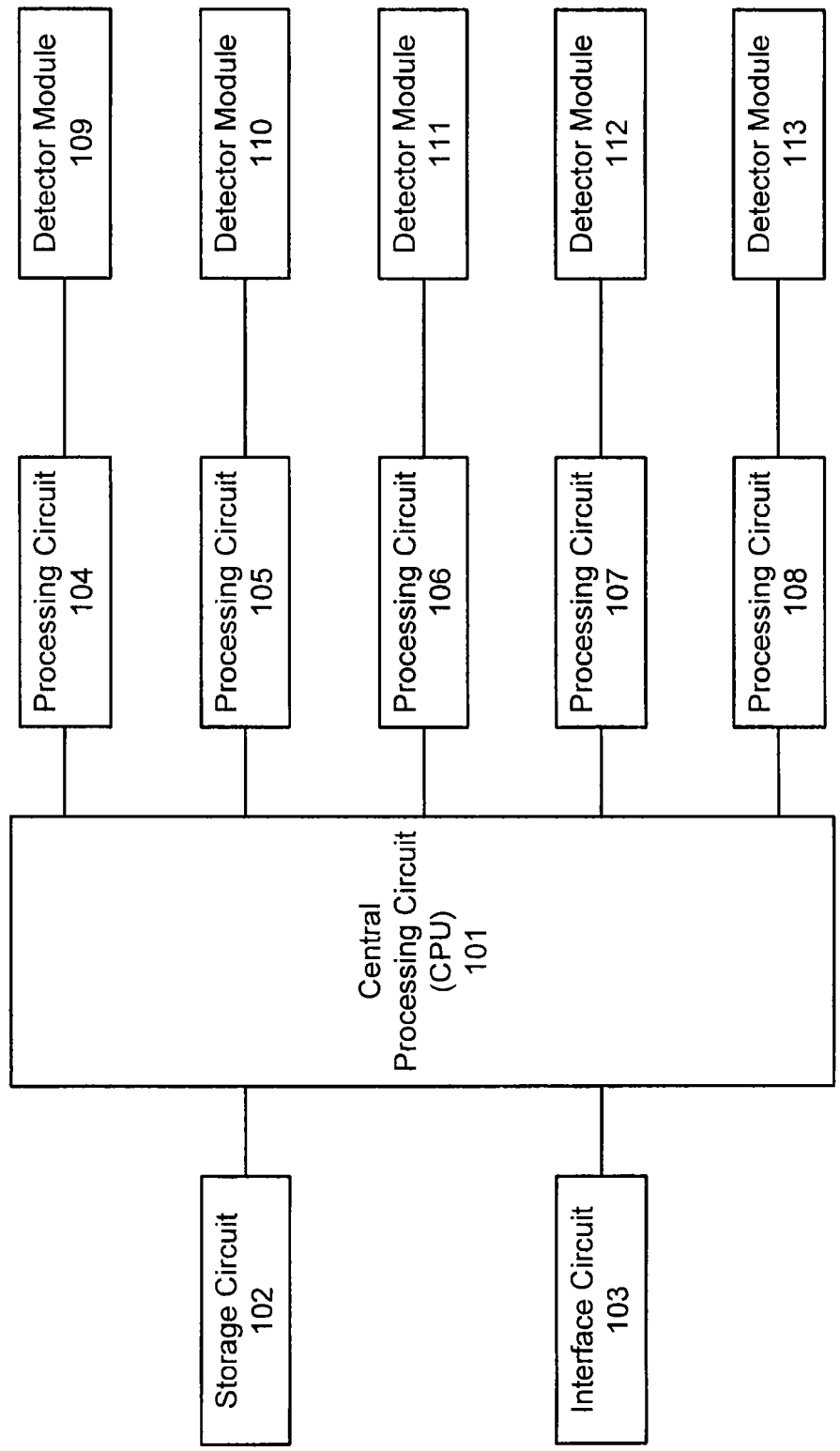
FIG. 1 is a block diagram of a PET system according to exemplary embodiments of the present disclosure.

In certain exemplary embodiments a power sequencing circuit, including an accelerometer, is attached to electronic detector modules of an imaging system, such as a PET imaging system, in order to determine a power sequencing of the electronic detector modules based on their respective positions.

According to an exemplary embodiment of the present disclosure, an electronic detector module includes an array of detection crystals that emits light in response to electromagnetic radiation, and at least one detector that detects the light emitted by the crystal array and that generates an output based on the light detected. The electronic detector module also includes a power sequencing circuit including an accelerometer that detects a position of the electronic detector module, and a control circuit that provides power to the electronic detector module based on the position.

In another exemplary embodiment, the accelerometer of the power sequencing circuit detects the position of the electronic detector module relative to a gravity vector of the Earth's gravity.

In another exemplary embodiment, the control circuit of the power sequencing circuit determines unique position information for the electronic detector module based on the position detected by the accelerometer.

In another exemplary embodiment, the control circuit of the power sequencing circuit determines the unique position information as two dimensional coordinates relative to the gravity vector and another axis normal thereto.

In another exemplary embodiment, the control circuit of the power sequencing circuit determines the unique position information as an angle relative to the gravity vector.

In another exemplary embodiment, the control circuit of the power sequencing circuit further includes an electronic memory to store a table relating positions to power states of the electronic detector module, and the control circuit determines whether to power the electronic detector module by comparing the unique position information to positions stored in the table.

In another exemplary embodiment, the power sequencing circuit further includes a switch to connect the electronic detector module to a power source under control of the control circuit.

In a further exemplary embodiment, a medical imaging system includes a plurality of electronic detector modules that detect electromagnetic radiation emitted from a subject under test, and a plurality of power sequencing circuits, each mounted on a respective one of the electronic detector modules. Each power sequencing circuit includes an accelerometer that detects a position of the electronic detector module, and a control circuit that provides power to the electronic detector module based on the position. The medical imaging system also includes a circuit that processes and stores outputs of the electronic detector modules.

In another exemplary embodiment in each of the power sequencing circuits of the medical imaging system, the accelerometer detects the position relative to a gravity vector of Earth's gravity.

In another exemplary embodiment, in each of the power sequencing circuits, the control circuit determines unique position information for the respective one of the electronic detector modules based on the position detected by the accelerometer.

In another exemplary embodiment, in each of the power sequencing circuits, the control circuit determines the unique position information as two dimensional coordinates relative to the gravity vector and another axis normal thereto.

In another exemplary embodiment, in each of the power sequencing circuits, the control circuit determines the unique position information as an angle relative to the gravity vector.

In another exemplary embodiment, in each of the power sequencing circuits, the control circuit further includes an electronic memory to store a table relating positions to power states of electronic detector modules, and the control circuit determines whether to power the respective one of the electronic detector modules by comparing the unique position information to positions stored in the table.

In another exemplary embodiment, each power sequencing circuit in the medical imaging system further includes a switch to connect the respective one of the electronic detector modules to a power supply of the medical imaging system under control of the control circuit.

In another exemplary embodiment, in each of the power sequencing circuits, the control circuit determines whether to supply power to the respective one of the electronic detector modules independent of the control circuit.

In another exemplary embodiment, the electronic detector modules of the medical imaging system are connected to the control circuit without a backplane of addressable connection slots.

In another exemplary embodiment, each electronic detector module of the medical imaging system further includes a crystal array that generates light in response to the electromagnetic radiation, and a plurality of photomultiplier tubes that generate detection signals in response to the light emitted by the crystal array.

In another exemplary embodiment, the medical imaging system is a positron emission tomography (PET) system, and the electromagnetic radiation includes gamma rays.

In another exemplary embodiment, the power sequencing circuits of the medical imaging system cause a subset of electronic detector modules to be powered in order to limit inrush current demands on a power supply of the medical imaging system.

In another exemplary embodiment, a power sequencing method in a medical imaging system includes determining positions of a plurality of electronic detector modules with respect to a gravity vector of Earth's gravity, where each of the plurality of electronic detector modules including an accelerometer to determine a respective one of the positions. The method also includes comparing the positions to positions in a table of positions, and limiting inrush current demands on a power supply of the medical imaging system by powering a subset of the plurality of electronic detectors based on the comparison of the positions with the positions in the table of positions.

Referring now to the drawings, wherein like reference numerals designate identical or corresponding parts throughout the several views, FIG. 1 is a block diagram of a medical imaging system, such as a PET system, according to an exemplary embodiment of the present disclosure. The PET system of FIG. 1 includes several electronic detector modules 109-113, each connected to a central processing circuit (CPU) 101 via processing circuitry 104-108. For example, electronic detector module 109 is connected to processing circuit 104, which is connected to the CPU 101. Although FIG. 1 illustrates the PET system as having five electronic detector modules for simplicity, one of ordinary skill in the art would recognize that the PET system may have more detector modules, for example forty. Thus, FIG. 1 is merely illustrative and does not limit the present disclosure.

Each detector module 109-113 generates detection signals based on detection of electromagnetic radiation, such as gamma rays. In the case of detector module 109, the detection signals are provided to the processing circuit 104 where they are filtered to improve their signal-to-noise ratios (SNR). The filtering may be performed using low pass, high pass or band pass filtering in either the analog or digital domain. The filtering may also be performed by a single filter or by cascading multiple filters. In addition to improving SNR, the filtering may also server to remove potential aliasing in subsequent digital-to-analog conversion.

After filtering, the processing circuit 104 may convert the detection signal into a digital signal and provide the result to the CPU 101. For example, the processing circuit 104 may include a free running analog-to-digital converter which provides raw samples to the CPU 101, and the CPU 101 can then integrate the samples to generate at a signal level for the detection signal. Alternatively, the processing circuit 104 may include an integrator to integrate the output of the analog-to-digital converter in order to provide the CPU 101 with a signal level directly.

When gamma rays are emitted from a subject under test, the gamma rays travel in opposite directions. Therefore, a gamma ray pair will impinge upon two electronic detector modules that are arranged across from each other at opposite sides of the subject under test. Because times of flight may vary, the processing circuit 104 may also include circuitry such as a summing amplifier, a discriminator and a time of flight detector to determine a time of flight for each gamma ray. This information is also provided by the processing circuit 104 to the CPU 101.

Although the above description focused on processing circuit 104 for simplicity, the description is also applicable to the other processing circuits 105-108, as can be appreciated. Processing circuits 104-108 may be formed from discrete components or may be implemented as an integrated circuit (IC), such as an application specific IC (ASIC). In addition, all processing circuits 104-108 may be implemented on a single ASIC even though the processing circuits 104-108 are kept separate. Alternatively, each processing circuit may be implemented on a separate IC or ASIC. Thus, the specific implementation of the processing circuits 104-108 is not limiting upon the present disclosure.

The CPU 101 further processes the data received from the processing circuits 104-108 to generate medical images which may then be transferred via the interface circuit 103 to another system for further processing or to a user interface for display. To this end the interface circuit 103 may be a wired interface, such as a universal serial bus (USB) interface or an Ethernet interface, or may be a wireless interface, such as a WiFi, Bluetooth or cellular interface. The interface circuit 104 may also allow interface the PET system to the Internet, as well as to a keyboard, display and pointing device, such as a mouse. The CPU 101 may also store the data in the storage circuit 102, which may include a CD-ROM, DVD-ROM, hard disk drive, or offsite storage in, for example, a server.

The CPU 101 itself may be formed of discrete logic components or may be implemented on a programmable logic device (PLD), such as a complex programmable logic device (CPLD) or a field programmable gate array (FPGA). Alternatively, the CPU 101 may be a microprocessor or a system of multiple processors including, for example, a microprocessor and a digital signal processor. As such, the specific implementation of the CPU 101 is not limiting upon the present disclosure.

As illustrated in FIG. 1, the electronic detector modules 109-113 are connected to the CPU 101 via the processing circuits 104-108. No backplane having addressable slots corresponding to each electronic detector module 109-113 is used. In this regard, the CPU 101 and the electronic detector modules do not communicate with each other with respect to power sequencing. Instead, each electronic detector module 109-113 includes a power sequencing circuit with determines when power should be supplied to its respective electronic detector module based on the electronic detector module's position, as is described in detail below.

Figure 2:
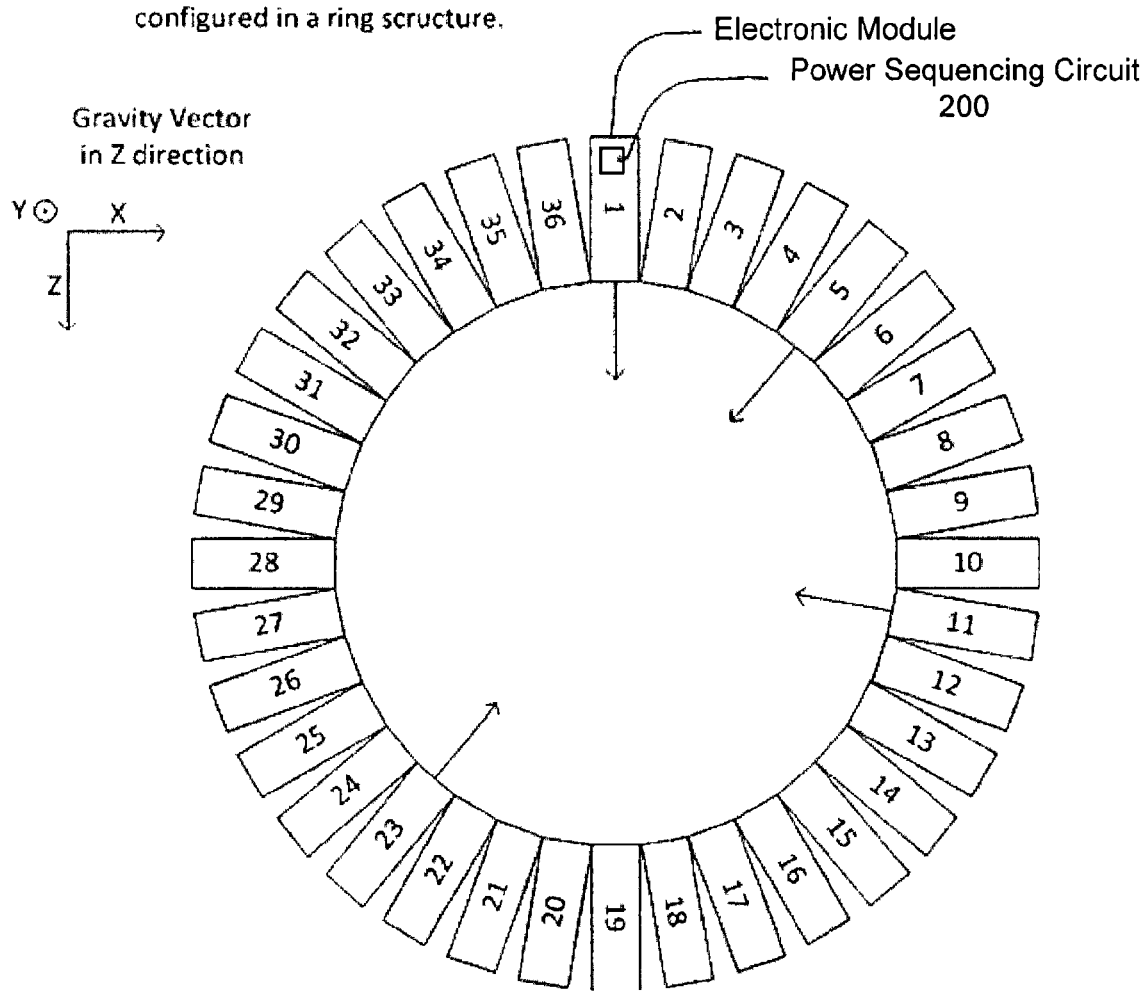
FIG. 2 is a plan view of electronic detector modules according to exemplary embodiments of the present disclosure.

FIG. 2 is an exemplary arrangement of electronic detector modules in a PET system according to exemplary embodiments of the present disclosure. In FIG. 2, electronic detector modules 1-36 are arranged in a ring having a predetermined radius such that all of the electronic detector modules face a subject under test located at a center of the ring (not shown). Each electronic detector module 1-36 includes a power sequencing circuit 200 to determine when to power the electronic detector module 1-36 based on its position. The power sequencing module 200 determines the position of its electronic detector module 1-36 relative to a vector corresponding to the Earth's gravity Z. The power sequencing module 200 may also determine a two-dimensional position (X, Z) or (Y, Z) or a three-dimensional position (X, Y, Z) in order to uniquely identify the position of its associated electronic detector module 1-36. For example, the power sequencing circuit may use the (X, Z), (Y, Z) or (X, Y, Z) coordinates of the electronic detector module 1-36 directly as the unique position thereof. Alternatively, the power sequencing circuit 200 may use the (X, Z), (Y, Z) or (X, Y, Z) coordinates to compute a vector having a magnitude and angle relative to the gravity vector Z as the unique position information. Since all electronic detector modules are arranged at an equal distance from the center of the ring, the magnitude of the position vector may be discarded since it will be the same for all of the electronic detector modules. The power sequencing circuit 200 may then use the angle and the sign of the magnitude (positive or negative) to compute an angle from 0° to 360° as the unique position information. Other methods of determining unique position information for each of the electronic detector modules 1-36 are also possible without departing from the scope of the present disclosure.

Figure 3:
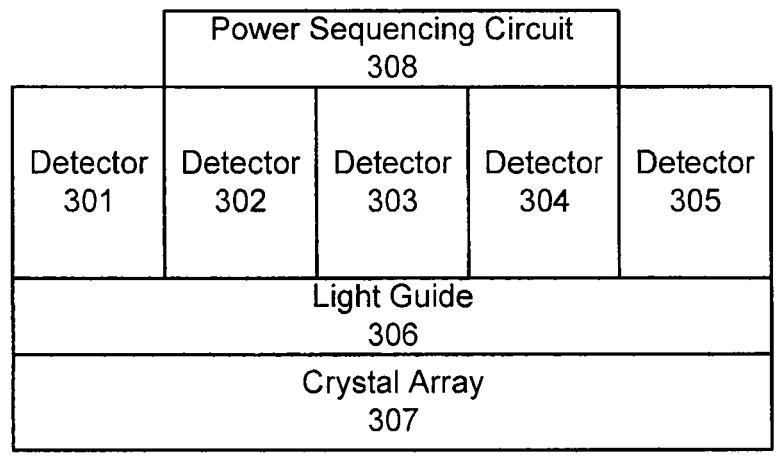
FIG. 3 is a block diagram of a detector module according to exemplary embodiments of the present disclosure.

FIG. 3 is a block diagram of an electronic detector module according to exemplary embodiments of the present disclosure. The electronic detector module includes detectors 301-305 arranged on a light guide 306, which is arranged on a crystal array 307. The detectors 301-305 may be photomultiplier tubes that detect scintillation light from the crystal array 307. Though, five detectors 301-305 are illustrated, more or fewer detectors are possible without departing from the scope of the present advancements. The detectors 301-305 may also be of different sizes.

The crystal array 307 includes a plurality of scintillation crystals that emit light in response to gamma ray impingement. The light guide 306 then directs the light from the crystals to the detectors 301-305, which generate detection signals as described above.

A power sequencing circuit 308 is also disposed on the electronic detector module in FIG. 3. Though the power sequencing circuit 308 is illustrated as being on top of the detectors 301-305, other positions are possible without departing from the scope of the present disclosure. The power sequencing circuit is connected to the power distribution system of the PET system in such a way as to be able to control power to the electronic detector module. As discussed above, the power sequencing circuit 308 detects the position of the electronic detector module relative to an Earth gravity vector and uses this information to determine when the electronic detector module should be powered. Since all of the electronic detector modules 1-36 in FIG. 2 include a power sequencing circuit 308, a subset of the electronic detector modules 1-36 may be powered at any given time in order to limit the amount of inrush current in the power supply of the PET system.

Figure 4:
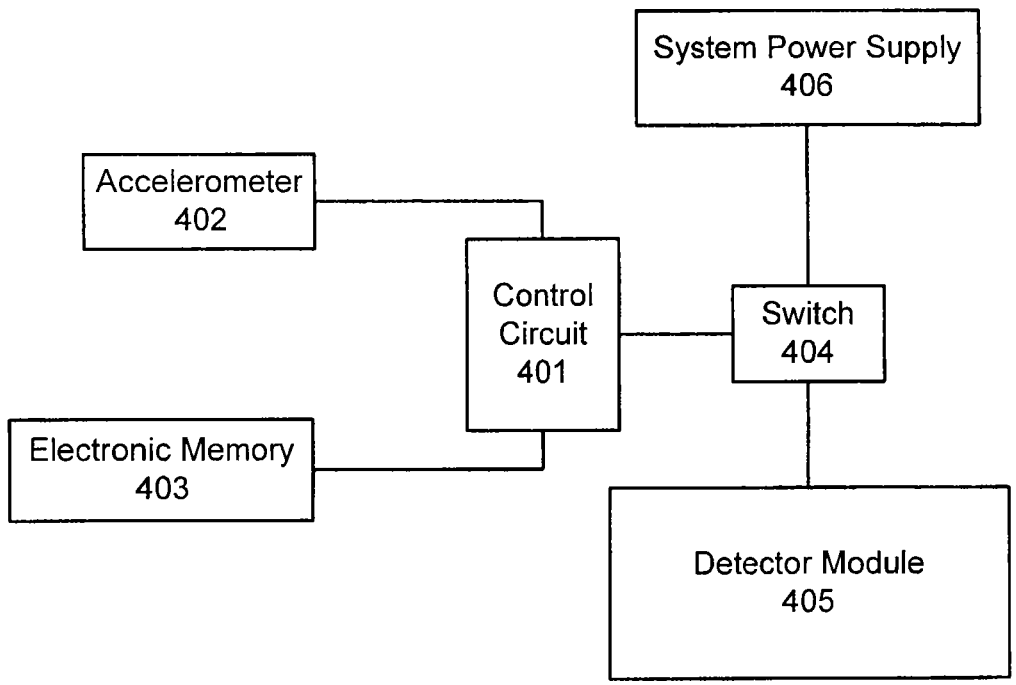
FIG. 4 is a block diagram of a power sequencing circuit according to exemplary embodiments of the present disclosure.

FIG. 4 is a block diagram of a power sequencing circuit according to an exemplary embodiment of the present disclosure. The power sequencing circuit includes a control circuit 401 that is connected to an accelerometer 402 and an electronic memory 403. The control circuit is also connected to a switch 404 which controls the flow of power from the system power supply 406 to the electronic detector module 405.

The accelerometer 402 generates position data relative to a vector of Earth's gravity. If the accelerometer 402 is a two-dimensional accelerometer, two-dimensional data is generated (X, Z) or (Y, Z). If the accelerometer 402 is a three-dimensional accelerometer, three-dimensional data is generated (X, Y, Z). As can be appreciated, the accelerometer 402 may be capacitive, piezoelectric, spring mass-based, microelectromechanical systems (MEMS) or the like.

The data from the accelerometer 402 is then processed by the control circuit 401 to generate unique position information for the electronic detector module 405. As discussed above, the unique position information may be coordinates (X, Z), (Y, Z) or (X, Y, Z), may be an angle and magnitude, may be an angle alone, etc. Also as noted above, the particular form of the unique position information is not limiting on the present disclosure.

The electronic memory 403 can store a look up table (LUT) that relates the unique position information generated by the control circuit 401 to a power state of the electronic detector module. The LUT may relate the unique position information to a power-on time for the electronic detector module 405. For example, if a first electronic detector module is to be powered at an arbitrary time T, the subsequent electronic detector modules may be powered, based on their unique position information, at times T+n, T+2n, T+3n . . . T+(m−1)n, where n is a fixed unit of time (for example 100 ms) and m is the total number of electronic detector modules. If the electronic detector modules are arranged in a ring, such as in FIG. 2, the ring may be powered in quadrants, such that all electronic detector modules in one quadrant are powered at the same, or substantially the same, time. Other sequencing schemes are also possible without departing from the scope of the present disclosure.

The control circuit 401 may include a timer, such as a real-time clock, to determine when the power-on time of the electronic detector module 405 has arrived. As can be appreciated, the electronic memory 403 may be read only memory (ROM), electronically erasable read only memory (EEPROM), random access memory (RAM), static random access memory (SRAM), or flash memory. Other electronic memories are also possible without departing from the scope of the present disclosure.

If, based on the LUT and the unique position, the control circuit 401 determines that the electronic detector module 405 is to be powered, the control circuit 401 causes the switch 404 to close, connecting the system power supply 406 to the electronic detector module 405. The switch 404 can be a mechanical switch, such as a relay, or a solid state switch, such as a junction field effect transistor (JFET), metal oxide semiconductor field effect transistor (MOSFET) or the like. If the control circuit 401 determines that the electronic detector module 405 should not be powered, the control circuit 401 places (or maintains) the switch 404 in the open position.

As can be appreciated the control circuit 401 may be implemented as discrete logic gates, a PLD, CPLD or FPGA, or may be a microcontroller IC. The control circuit 401 may also be dedicated to the power sequencing circuit, or may be shared with the electronic detector module 405. In one exemplary embodiment, a control circuit of the electronic detector module also performs the tasks of the control circuit 401 as described above. Thus, several implementations of the control circuit 401 are possible without departing from the scope of the present disclosure.

Figure 5:
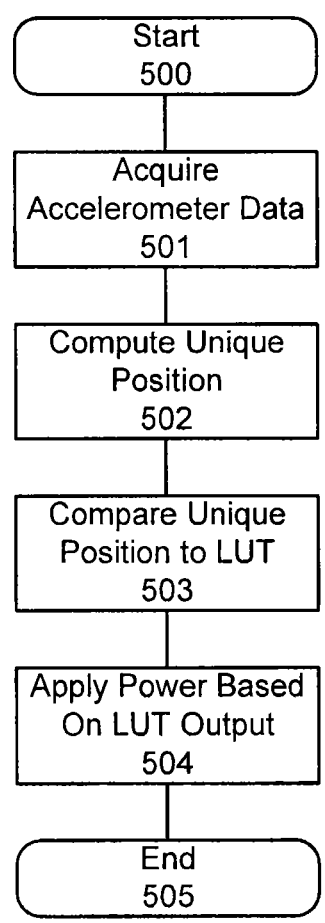
FIG. 5 is an algorithmic flowchart of a power sequencing method according to exemplary embodiments of the present disclosure.

Next, an algorithmic process for power sequencing of electronic detector modules according to exemplary embodiments of the present disclosure is described with reference to FIG. 5. In FIG. 5, the process begins at step 500. At step 501, data from the accelerometer 402 is acquired by the control circuit 401. The control circuit then computes unique position information at step 502. As described above, the unique position information may be two or three dimensional coordinates, an angle, or the like. At step 503 the control circuit 401 compares the unique position information computed in step 502 with the position information stored in the LUT in order to determine the power state of the electronic detector module. At step 504 the control circuit 401 applies power to the electronic detector module 405 or does not apply power to the electronic detector module 405 based on the results of the LUT comparison. The process then ends at step 505.

As can be appreciated, a set of computer-readable instructions may be stored on computer-readable media, such as the electronic memory 403. These instructions may then be executed by a computer or processor, such as the control circuit 401, to cause the computer or processor to perform the algorithmic method described with reference to FIG. 5.

For simplicity and ease of understanding, the descriptions herein are made with respect to a PET system. However, the present disclosure is not limited to PET systems, but may also be applied to other imaging systems such as baggage scanners, freight scanners and the like. As such, the descriptions with respect to PET systems are merely illustrative rather than limiting of the present disclosure.

Obviously, numerous modifications and variations of the present invention are possible in light of the above teachings. It is therefore to be understood that within the scope of the appended claims, the invention may be practiced otherwise than as specifically described herein.

The invention claimed is:

1. An electronic detector module, comprising:
   an array of detection crystals configured to emit light in response to electromagnetic radiation;
   at least one detector configured to detect the light emitted by the crystal array, and to generate an output based on the light detected; and
   a power sequencing circuit including
      an accelerometer configured to detect a position of the electronic detector module, and
      a control circuit configured to provide power to the electronic detector module based on the position.

2. The electronic detector module according to claim 1, wherein the accelerometer of the power sequencing circuit detects the position of the electronic detector module relative to a gravity vector of the Earth's gravity.

3. The electronic detector module according to claim 2, wherein the control circuit of the power sequencing circuit determines unique position information for the electronic detector module based on the position detected by the accelerometer.

4. The electronic detector module according to claim 3, wherein the control circuit of the power sequencing circuit determines the unique position information as two dimensional coordinates relative to the gravity vector and another axis normal thereto.

5. The electronic detector module according to claim 3, wherein the control circuit of the power sequencing circuit determines the unique position information as an angle relative to the gravity vector.

6. The electronic detector module according to claim 3, wherein the control circuit of the power sequencing circuit further includes an electronic memory to store a table relating positions to power states of the electronic detector module, and the control circuit determines whether to power the electronic detector module by comparing the unique position information to positions stored in the table.

7. The electronic detector module according to claim 1, wherein the power sequencing circuit further includes a switch to connect the electronic detector module to a power source under control of the control circuit.

8. A medical imaging system, comprising:
   a plurality of electronic detector modules configured to detect electromagnetic radiation emitted from a subject under test;
   a plurality of power sequencing circuits, each mounted on a respective one of the electronic detector modules, and each including
      an accelerometer configured to detect a position of the electronic detector module, and
      a control circuit configured to provide power to the electronic detector module based on the position; and
   a control circuit configured to process and store outputs of the electronic detector modules.

9. The medical imaging system according to claim 8, wherein in each of the power sequencing circuits the accelerometer detects the position relative to a gravity vector of Earth's gravity.

10. The medical imaging system according to claim 9, wherein in each of the power sequencing circuits, the control circuit determines unique position information for the respective one of the electronic detector modules based on the position detected by the accelerometer.

11. The medical imaging system according to claim 10, wherein in each of the power sequencing circuits, the control circuit determines the unique position information as two dimensional coordinates relative to the gravity vector and another axis normal thereto.

12. The medical imaging system according to claim 11, wherein each power sequencing circuit further includes a switch to connect the respective one of the electronic detector modules to a power supply of the medical imaging system under control of the control circuit.

13. The medical imaging device according to claim 12, wherein the power sequencing circuits cause a subset of electronic detector modules to be powered in order to limit inrush current demands on a power supply of the medical imaging system.

14. The medical imaging system according to claim 10 wherein in each of the power sequencing circuits, the control circuit determines the unique position information as an angle relative to the gravity vector.

15. The medical imaging system according to claim 10, wherein in each of the power sequencing circuits, the control circuit further includes an electronic memory to store a table relating positions to power states of electronic detector modules, and the control circuit determines whether to power the respective one of the electronic detector modules by comparing the unique position information to positions stored in the table.

16. The medical imaging system according to claim 8, wherein in each of the power sequencing circuits, the control circuit determines whether to supply power to the respective one of the electronic detector modules independent of the control circuit.

17. The medical imaging system according to claim 16, wherein the electronic detector modules are connected to the control circuit without a backplane of addressable connection slots.

18. The medical imaging system according to claim 8, wherein each electronic detector module further includes:
   a crystal array configured to generate light in response to the electromagnetic radiation; and
   a plurality of photomultiplier tubes configured to generate detection signals in response to the light emitted by the crystal array.

19. The medical imaging system according to claim 18, wherein the medical imaging system is a positron emission tomography (PET) system, and the electromagnetic radiation includes gamma rays.

20. A power sequencing method in a medical imaging system, comprising:
- determining positions of a plurality of electronic detector modules with respect to a gravity vector of Earth's gravity, each of the plurality of electronic detector modules including an accelerometer to determine a respective one of the positions;
- comparing the positions to positions in a table of positions; and
- limiting inrush current demands on a power supply of the medical imaging system by powering a subset of the plurality of electronic detectors based on the comparison of the positions with the positions in the table of positions.

* * * * *